(12) United States Patent
Takano

(10) Patent No.: US 7,532,602 B2
(45) Date of Patent: May 12, 2009

(54) INFORMATION TRANSMISSION METHOD, MOBILE COMMUNICATIONS SYSTEM, BASE STATION AND MOBILE STATION

(75) Inventor: Michiaki Takano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 680 days.

(21) Appl. No.: 11/311,271

(22) Filed: Dec. 20, 2005

(65) Prior Publication Data

US 2006/0098602 A1 May 11, 2006

Related U.S. Application Data

(62) Division of application No. 10/498,009, filed as application No. PCT/JP03/01035 on Jan. 31, 2003, now Pat. No. 7,061,892.

(30) Foreign Application Priority Data

Jan. 31, 2002 (JP) ............................... 2002-23784
Nov. 11, 2002 (CN) ............................... 02 1 50388
Nov. 11, 2002 (EP) ............................... 02025054

(51) Int. Cl.
*H04B 7/216* (2006.01)
(52) U.S. Cl. .................... 370/335; 370/341; 370/342; 370/537; 455/102; 455/103; 455/522
(58) Field of Classification Search ................ 370/335, 370/341, 342, 537; 455/102, 103, 522
See application file for complete search history.

(56) References Cited

U.S. PATENT DOCUMENTS 5,404,355 A 4/1995 Raith 6,167,031 A 12/2000 Olofsson et al.

(Continued)

FOREIGN PATENT DOCUMENTS

DE 100 25 286 A1 6/2001

(Continued)

OTHER PUBLICATIONS

"3rd Generation Partnership Project; Technical Specification Group Radio Access Network; High Speed Downlink Packet Access: Physical Layer Aspects (Release 5)", 3GPP TR 25.858 v1.0.0, pp. 11-21.

(Continued)

*Primary Examiner*—Danh Le
*Assistant Examiner*—Inder P Mehra
(74) *Attorney, Agent, or Firm*—Oblon, Spivak, McClelland, Maier & Neustadt, P.C.

(57) ABSTRACT

In an information transmission method, a radio communications system, a base station and a mobile station, a TBS size, a modulation scheme and the number of codes in a multicode are converted into identification data having a relatively smaller data size before being transmitted to a destination of communication. The TBS size is identified by using, in combination, an identification code identifying a channelization code set, an identification code identifying a modulation scheme, and an identification code obtained by converting a combination of the number of codes in a multicode and a modulation pattern identification (TFRC) into a corresponding code. Accordingly, the data size for TBS size identification is reduced.

11 Claims, 11 Drawing Sheets

U.S. PATENT DOCUMENTS

| | | |
|---|---|---|
| 2002/0128035 A1* | 9/2002 | Jokinen et al. .............. 455/552 |
| 2002/0164029 A1 | 11/2002 | Jiang |
| 2003/0039230 A1 | 2/2003 | Ostman et al. |
| 2004/0248582 A1 | 12/2004 | Belaiche et al. |

FOREIGN PATENT DOCUMENTS

| | | |
|---|---|---|
| JP | 8-274756 | 10/1996 |
| JP | 9-135275 | 5/1997 |
| JP | 2000-49866 | 2/2000 |
| JP | 2001-515307 | 9/2001 |
| JP | 2002-533032 | 10/2002 |
| JP | 3399923 | 2/2003 |
| JP | 2003-508983 | 3/2003 |
| WO | 00/21235 | 4/2000 |
| WO | WO 00/72496 A1 | 11/2000 |

OTHER PUBLICATIONS

Matsuoka H. et al., "Adaptive Modulation System with Variable Coding Rate Concatenated Code for High Quality Multi-Media Communication Systems", Vehicular Technology Conference, 1996. Mobile Technology for the Human Race., IEEE 46th Atlanta, GA., USA, Apr. 28- May 1, 1996, New York, NY, USA, IEEE, US Apr. 28, 1996, pp. 487-491, XP010162435.

Toskala A. et al. "Frames FMA2 Wideband-CDMA for UMTS", European Transactions on Telecommunications, Eurel Publication, Milano, IT, vol. 9, No. 4, Jul. 1, 1998; pp. 325-335; XP000778096.

"R1-01-0874, DL signaling for HSDPA", Samsung Electronics, TSG-RAN WG1 Meeting #21, XP-002291724, Aug. 27-31, 2001, 10 pages.

"HSDPA related signaling parameters in downlink-Tdoc 12A010005", Nokia, TSG-RAN WG1/WG2 adhoc on HSDPA, XP-002290532, Apr. 5-6, 2001, 5 pages.

"HSDPA Signaling Requirements", Motorola, TSG-Ran Working Group 2, XP-002290533, Jan. 15-19, 2001, 2 pages.

* cited by examiner

FIG.1

| TFRC(x) | MODULATION | TBS SIZE | NO. OF CODES IN MULTICODE |
|---|---|---|---|
| TFRC(1) | QPSK | 1200 | 5 |
| TFRC(2) | QPSK | 2400 | 5 |
| TFRC(3) | QPSK | 3600 | 5 |
| TFRC(4) | 16QAM | 4800 | 5 |
| TFRC(5) | 16QAM | 6000 | 5 |
| TFRC(6) | 16QAM | 7200 | 5 |

FIG.6

| INITIAL VALUE | NO. OF CODES IN MULTICODE | IDENTIFICATION CODE |
|---|---|---|
| Cch(16, 1) | 1 | 0 |
| Cch(16, 1) | 2 | 1 |
| Cch(16, 1) | 3 | 2 |
| Cch(16, 1) | 4 | 3 |
| Cch(16, 1) | 5 | 4 |
| Cch(16, 1) | 6 | 5 |
| Cch(16, 1) | 7 | 6 |
| Cch(16, 1) | 8 | 7 |
| Cch(16, 1) | 9 | 8 |
| Cch(16, 1) | 10 | 9 |
| Cch(16, 1) | 11 | 10 |
| Cch(16, 1) | 12 | 11 |
| Cch(16, 1) | 13 | 12 |
| Cch(16, 1) | 14 | 13 |
| Cch(16, 1) | 15 | 14 |
| Cch(16, 2) | 1 | 15 |
| Cch(16, 2) | 2 | 16 |
| Cch(16, 2) | 3 | 17 |
| Cch(16, 2) | 4 | 18 |
| Cch(16, 2) | 5 | 19 |
| Cch(16, 2) | 6 | 20 |
| Cch(16, 2) | 7 | 21 |
| Cch(16, 2) | 8 | 22 |
| Cch(16, 2) | 9 | 23 |
| Cch(16, 2) | 10 | 24 |
| Cch(16, 2) | 11 | 25 |
| Cch(16, 2) | 12 | 26 |
| Cch(16, 2) | 13 | 27 |
| Cch(16, 2) | 14 | 28 |
| Cch(16, 3) | 1 | 29 |
| Cch(16, 3) | 2 | 30 |
| Cch(16, 3) | 3 | 31 |
| Cch(16, 3) | 4 | 32 |
| Cch(16, 3) | 5 | 33 |
| Cch(16, 3) | 6 | 34 |
| Cch(16, 3) | 7 | 35 |
| Cch(16, 3) | 8 | 36 |
| Cch(16, 3) | 9 | 37 |
| Cch(16, 3) | 10 | 38 |
| Cch(16, 3) | 11 | 39 |

FIG.7

| INITIAL VALUE | NO. OF CODES IN MULTICODE | IDENTIFICATION CODE |
|---|---|---|
| Cch(16, 3) | 12 | 40 |
| Cch(16, 3) | 13 | 41 |
| Cch(16, 4) | 1 | 42 |
| Cch(16, 4) | 2 | 43 |
| Cch(16, 4) | 3 | 44 |
| Cch(16, 4) | 4 | 45 |
| Cch(16, 4) | 5 | 46 |
| Cch(16, 4) | 6 | 47 |
| Cch(16, 4) | 7 | 48 |
| Cch(16, 4) | 8 | 49 |
| Cch(16, 4) | 9 | 50 |
| Cch(16, 4) | 10 | 51 |
| Cch(16, 4) | 11 | 52 |
| Cch(16, 4) | 12 | 53 |
| Cch(16, 5) | 1 | 54 |
| Cch(16, 5) | 2 | 55 |
| Cch(16, 5) | 3 | 56 |
| Cch(16, 5) | 4 | 57 |
| Cch(16, 5) | 5 | 58 |
| Cch(16, 5) | 6 | 59 |
| Cch(16, 5) | 7 | 60 |
| Cch(16, 5) | 8 | 61 |
| Cch(16, 5) | 9 | 62 |
| Cch(16, 5) | 10 | 63 |
| Cch(16, 5) | 11 | 64 |
| Cch(16, 6) | 1 | 65 |
| Cch(16, 6) | 2 | 66 |
| Cch(16, 6) | 3 | 67 |
| Cch(16, 6) | 4 | 68 |
| Cch(16, 6) | 5 | 69 |
| Cch(16, 6) | 6 | 70 |
| Cch(16, 6) | 7 | 71 |
| Cch(16, 6) | 8 | 72 |
| Cch(16, 6) | 9 | 73 |
| Cch(16, 6) | 10 | 74 |
| Cch(16, 7) | 1 | 75 |
| Cch(16, 7) | 2 | 76 |
| Cch(16, 7) | 3 | 77 |
| Cch(16, 7) | 4 | 78 |
| Cch(16, 7) | 5 | 79 |

FIG.8

| INITIAL VALUE | NO. OF CODES IN MULTICODE | IDENTIFICATION CODE |
|---|---|---|
| Cch(16, 7) | 6 | 80 |
| Cch(16, 7) | 7 | 81 |
| Cch(16, 7) | 8 | 82 |
| Cch(16, 7) | 9 | 83 |
| Cch(16, 8) | 1 | 84 |
| Cch(16, 8) | 2 | 85 |
| Cch(16, 8) | 3 | 86 |
| Cch(16, 8) | 4 | 87 |
| Cch(16, 8) | 5 | 88 |
| Cch(16, 8) | 6 | 89 |
| Cch(16, 8) | 7 | 90 |
| Cch(16, 8) | 8 | 91 |
| Cch(16, 9) | 1 | 92 |
| Cch(16, 9) | 2 | 93 |
| Cch(16, 9) | 3 | 94 |
| Cch(16, 9) | 4 | 95 |
| Cch(16, 9) | 5 | 96 |
| Cch(16, 9) | 6 | 97 |
| Cch(16, 9) | 7 | 98 |
| Cch(16, 10) | 1 | 99 |
| Cch(16, 10) | 2 | 100 |
| Cch(16, 10) | 3 | 101 |
| Cch(16, 10) | 4 | 102 |
| Cch(16, 10) | 5 | 103 |
| Cch(16, 10) | 6 | 104 |
| Cch(16, 11) | 1 | 105 |
| Cch(16, 11) | 2 | 106 |
| Cch(16, 11) | 3 | 107 |
| Cch(16, 11) | 4 | 108 |
| Cch(16, 11) | 5 | 109 |
| Cch(16, 12) | 1 | 110 |
| Cch(16, 12) | 2 | 111 |
| Cch(16, 12) | 3 | 112 |
| Cch(16, 12) | 4 | 113 |
| Cch(16, 13) | 1 | 114 |
| Cch(16, 13) | 2 | 115 |
| Cch(16, 13) | 3 | 116 |
| Cch(16, 14) | 1 | 117 |
| Cch(16, 14) | 2 | 118 |
| Cch(16, 15) | 1 | 119 |

FIG.9

| MODULATION SCHEME | IDENTIFICATION CODE |
|---|---|
| QPSK | 0 |
| 16QAM | 1 |

FIG.10

| TFRC(x, y) | MODULATION SCHEME | TrBlk SIZE | NO. OF TrBlk | TBS SIZE | NO. OF CODES IN MULTICODE | IDENTIFICATION CODE | |
|---|---|---|---|---|---|---|---|
| | | | | | | RELATED ART | EMBODIMENT |
| TFRC(1, 1) | QPSK | 240 | 1 | 240 | 1 | 1 | 1 |
| TFRC(2, 1) | QPSK | 240 | 2 | 480 | 1 | 2 | 2 |
| TFRC(3, 1) | QPSK | 240 | 3 | 720 | 1 | 3 | 3 |
| TFRC(4, 1) | 16QAM | 240 | 4 | 960 | 1 | 4 | 1 |
| TFRC(5, 1) | 16QAM | 240 | 5 | 1200 | 1 | 5 | 2 |
| TFRC(6, 1) | 16QAM | 240 | 6 | 1440 | 1 | 6 | 3 |
| TFRC(1, 2) | QPSK | 240 | 2 | 480 | 2 | 2 | 1 |
| TFRC(2, 2) | QPSK | 240 | 4 | 960 | 2 | 4 | 2 |
| TFRC(3, 2) | QPSK | 240 | 6 | 1440 | 2 | 6 | 3 |
| TFRC(4, 2) | 16QAM | 240 | 8 | 1920 | 2 | 8 | 1 |
| TFRC(5, 2) | 16QAM | 240 | 10 | 2400 | 2 | 10 | 2 |
| TFRC(6, 2) | 16QAM | 240 | 12 | 2880 | 2 | 12 | 3 |
| TFRC(1, 3) | QPSK | 240 | 3 | 720 | 3 | 3 | 1 |
| TFRC(2, 3) | QPSK | 240 | 6 | 1440 | 3 | 6 | 2 |
| TFRC(3, 3) | QPSK | 240 | 9 | 2160 | 3 | 9 | 3 |
| TFRC(4, 3) | 16QAM | 240 | 12 | 2880 | 3 | 12 | 1 |
| TFRC(5, 3) | 16QAM | 240 | 15 | 3600 | 3 | 15 | 2 |
| TFRC(6, 3) | 16QAM | 240 | 18 | 4320 | 3 | 18 | 3 |
| TFRC(1, 4) | QPSK | 240 | 4 | 960 | 4 | 4 | 1 |
| TFRC(2, 4) | QPSK | 240 | 8 | 1920 | 4 | 8 | 2 |
| TFRC(3, 4) | QPSK | 240 | 12 | 2880 | 4 | 12 | 3 |
| TFRC(4, 4) | 16QAM | 240 | 16 | 3840 | 4 | 16 | 1 |
| TFRC(5, 4) | 16QAM | 240 | 20 | 4800 | 4 | 20 | 2 |
| TFRC(6, 4) | 16QAM | 240 | 24 | 5760 | 4 | 24 | 3 |
| TFRC(1, 5) | QPSK | 240 | 5 | 1200 | 5 | 5 | 1 |
| TFRC(2, 5) | QPSK | 240 | 10 | 2400 | 5 | 10 | 2 |
| TFRC(3, 5) | QPSK | 240 | 15 | 3600 | 5 | 15 | 3 |
| TFRC(4, 5) | 16QAM | 240 | 20 | 4800 | 5 | 20 | 1 |
| TFRC(5, 5) | 16QAM | 240 | 25 | 6000 | 5 | 25 | 2 |
| TFRC(6, 5) | 16QAM | 240 | 30 | 7200 | 5 | 30 | 3 |

FIG.11

| TFRC(x, y) | MODULA-TION SCHEME | TrBlk SIZE | NO. OF TrBlk | TBS SIZE | NO. OF CODES IN MULTICODE | IDENTIFICATION CODE | |
|---|---|---|---|---|---|---|---|
| | | | | | | RELATED ART | EMBODI-MENT |
| TFRC(1, 6) | QPSK | 240 | 6 | 1440 | 6 | 6 | 1 |
| TFRC(2, 6) | QPSK | 240 | 12 | 2880 | 6 | 12 | 2 |
| TFRC(3, 6) | QPSK | 240 | 18 | 4320 | 6 | 18 | 3 |
| TFRC(4, 6) | 16QAM | 240 | 24 | 5760 | 6 | 24 | 1 |
| TFRC(5, 6) | 16QAM | 240 | 30 | 7200 | 6 | 30 | 2 |
| TFRC(6, 6) | 16QAM | 240 | 36 | 8640 | 6 | 36 | 3 |
| TFRC(1, 7) | QPSK | 240 | 7 | 1680 | 7 | 7 | 1 |
| TFRC(2, 7) | QPSK | 240 | 14 | 3360 | 7 | 14 | 2 |
| TFRC(3, 7) | QPSK | 240 | 21 | 5040 | 7 | 21 | 3 |
| TFRC(4, 7) | 16QAM | 240 | 28 | 6720 | 7 | 28 | 1 |
| TFRC(5, 7) | 16QAM | 240 | 35 | 8400 | 7 | 35 | 2 |
| TFRC(6, 7) | 16QAM | 240 | 42 | 10080 | 7 | 42 | 3 |
| TFRC(1, 8) | QPSK | 240 | 8 | 1920 | 8 | 8 | 1 |
| TFRC(2, 8) | QPSK | 240 | 16 | 3840 | 8 | 16 | 2 |
| TFRC(3, 8) | QPSK | 240 | 24 | 5760 | 8 | 24 | 3 |
| TFRC(4, 8) | 16QAM | 240 | 32 | 7680 | 8 | 32 | 1 |
| TFRC(5, 8) | 16QAM | 240 | 40 | 9600 | 8 | 40 | 2 |
| TFRC(6, 8) | 16QAM | 240 | 48 | 11520 | 8 | 48 | 3 |
| TFRC(1, 9) | QPSK | 240 | 9 | 2160 | 9 | 9 | 1 |
| TFRC(2, 9) | QPSK | 240 | 18 | 4320 | 9 | 18 | 2 |
| TFRC(3, 9) | QPSK | 240 | 27 | 6480 | 9 | 27 | 3 |
| TFRC(4, 9) | 16QAM | 240 | 36 | 8640 | 9 | 36 | 1 |
| TFRC(5, 9) | 16QAM | 240 | 45 | 10800 | 9 | 45 | 2 |
| TFRC(6, 9) | 16QAM | 240 | 54 | 12960 | 9 | 54 | 3 |
| TFRC(1, 10) | QPSK | 240 | 10 | 2400 | 10 | 10 | 1 |
| TFRC(2, 10) | QPSK | 240 | 20 | 4800 | 10 | 20 | 2 |
| TFRC(3, 10) | QPSK | 240 | 30 | 7200 | 10 | 30 | 3 |
| TFRC(4, 10) | 16QAM | 240 | 40 | 9600 | 10 | 40 | 1 |
| TFRC(5, 10) | 16QAM | 240 | 50 | 12000 | 10 | 50 | 2 |
| TFRC(6, 10) | 16QAM | 240 | 60 | 14400 | 10 | 60 | 3 |

FIG.12

| TFRC(x, y) | MODULA-TION SCHEME | TrBlk SIZE | NO. OF TrBlk | TBS SIZE | NO. OF CODES IN MULTICODE | IDENTIFICATION CODE | |
|---|---|---|---|---|---|---|---|
| | | | | | | RELATED ART | EMBODI-MENT |
| TFRC(1, 11) | QPSK | 240 | 11 | 2640 | 11 | 11 | 1 |
| TFRC(2, 11) | QPSK | 240 | 22 | 5280 | 11 | 22 | 2 |
| TFRC(3, 11) | QPSK | 240 | 33 | 7920 | 11 | 33 | 3 |
| TFRC(4, 11) | 16QAM | 240 | 44 | 10560 | 11 | 44 | 1 |
| TFRC(5, 11) | 16QAM | 240 | 55 | 13200 | 11 | 55 | 2 |
| TFRC(6, 11) | 16QAM | 240 | 66 | 15840 | 11 | 66 | 3 |
| TFRC(1, 12) | QPSK | 240 | 12 | 2880 | 12 | 12 | 1 |
| TFRC(2, 12) | QPSK | 240 | 24 | 5760 | 12 | 24 | 2 |
| TFRC(3, 12) | QPSK | 240 | 36 | 8640 | 12 | 36 | 3 |
| TFRC(4, 12) | 16QAM | 240 | 48 | 11520 | 12 | 48 | 1 |
| TFRC(5, 12) | 16QAM | 240 | 60 | 14400 | 12 | 60 | 2 |
| TFRC(6, 12) | 16QAM | 240 | 72 | 17280 | 12 | 72 | 3 |
| TFRC(1, 13) | QPSK | 240 | 13 | 3120 | 13 | 13 | 1 |
| TFRC(2, 13) | QPSK | 240 | 26 | 6240 | 13 | 26 | 2 |
| TFRC(3, 13) | QPSK | 240 | 39 | 9360 | 13 | 39 | 3 |
| TFRC(4, 13) | 16QAM | 240 | 52 | 12480 | 13 | 52 | 1 |
| TFRC(5, 13) | 16QAM | 240 | 65 | 15600 | 13 | 65 | 2 |
| TFRC(6, 13) | 16QAM | 240 | 78 | 18720 | 13 | 78 | 3 |
| TFRC(1, 14) | QPSK | 240 | 14 | 3360 | 14 | 14 | 1 |
| TFRC(2, 14) | QPSK | 240 | 28 | 6720 | 14 | 28 | 2 |
| TFRC(3, 14) | QPSK | 240 | 42 | 10800 | 14 | 42 | 3 |
| TFRC(4, 14) | 16QAM | 240 | 56 | 13440 | 14 | 56 | 1 |
| TFRC(5, 14) | 16QAM | 240 | 70 | 16800 | 14 | 70 | 2 |
| TFRC(6, 14) | 16QAM | 240 | 84 | 20160 | 14 | 84 | 3 |
| TFRC(1, 15) | QPSK | 240 | 15 | 3600 | 15 | 15 | 1 |
| TFRC(2, 15) | QPSK | 240 | 30 | 7200 | 15 | 30 | 2 |
| TFRC(3, 15) | QPSK | 240 | 45 | 10800 | 15 | 45 | 3 |
| TFRC(4, 15) | 16QAM | 240 | 60 | 14400 | 15 | 60 | 1 |
| TFRC(5, 15) | 16QAM | 240 | 75 | 18000 | 15 | 75 | 2 |
| TFRC(6, 15) | 16QAM | 240 | 90 | 21600 | 15 | 90 | 3 |

INFORMATION TRANSMISSION METHOD, MOBILE COMMUNICATIONS SYSTEM, BASE STATION AND MOBILE STATION

TECHNICAL FIELD

The present invention generally relates to information transmission methods, mobile communications systems, mobile stations and base stations and, more particularly, to an information transmission method, a mobile communications system, a base station and a mobile station in which information is converted into identification data having a relatively small data size.

BACKGROUND ART

For downstream transmission in a mobile communications system, i.e. data transmission from a base station to a mobile station, a technology known as high speed downlink packet access (HSDPA) is used for high-speed, large-volume downloading. A discussion on HSPDA underway in 3rd Generation Partnership Project (3GPP) is directed to changing of a modulation scheme and a Turbo coding rate in accordance with the quality of reception at a mobile station. In changing a modulation scheme and a Turbo coding rate, it is necessary for a base station to notify a mobile station of the modulation scheme and the Turbo coding rate to be used. Particularly, in adaptive modulation coding (AMC) in which a modulation scheme and a Turbo coding rate are adaptively changed, transmission (signaling) of information related to the modulation coding scheme from the base station to the mobile station occurs frequently.

3GPP Technical Report (TR) 25.858V1.0.0 "8 Associated Signaling" (hereinafter, referred to as reference 1) gives a description of the signaling. Information related to the modulation coding scheme includes transport-format and resource combination (TFRC).

FIG. 1 shows an example of TFRC list given in reference 1. The list is provided in a portion of reference 1 where uplink signaling is described. The list lists substantially the same information related to the modulation coding scheme transmitted from the base station to the mobile station in downlink signaling. The list lists combinations of a modulation scheme, a transport block set (TBS) size and the number of codes.

The modulation scheme may be one of two digital modulation schemes including quadrature phase shift keying and (QPSK) and 16 quadrature amplitude modulation (QAM). A TBS size indicates the data size of a transport block (TrBlk) included in a frame multiplied by the number of blocks. That is, the TBS size indicates the data size of a frame. A TBS size is a parameter related to Turbo coding and is one type of information related to modulation coding scheme. It is assumed here that a multicode scheme, in which a plurality of channelization codes (spreading codes) are assigned to a mobile station, is used. The list lists the number of codes included in a multicode (in the illustration, the number of codes is 5).

For example, TFRC(1) includes parameters such that the modulation scheme=QPSK, the TBS size=1200 bit and the number of codes=5. In the case of TFRC6, the modulation scheme=16 QAM, the TBS size=7200 bit and the number of codes=5. Assuming that spreading factor (SF)=16 and one frame=2 ms, the data size per frame is 4800 bits when the modulation scheme=QPSK, 9600 bits when the modulation scheme=16 QAM. The turbo coding rate is ¼ for TFRC(1), ½ for TFRC(2), ¾ for TFRC(3), ½ for TFRC(4), ⅝ for TFRC (5) and ¾ for TFRC(6). The information given above is not immediately available from the table of FIG. 11, though.

In transmitting the information (TFRC, according to reference 1) related to the modulation coding scheme from the base station to the mobile station, the information is converted into identification data having a small data size for transmission. The identification data corresponds to transport-format and resource related information (TFRI) of reference 1. The data size of TFRI is defined in reference 1 as follows.

Channelization code set: 7 bits

Modulation scheme: 1 bit

Transport block set size: 6 bits

A channelization code set is a combination of a plurality of channelization codes assigned to a mobile station according to a multicode scheme. FIG. 1, listing TFRCs, would not be complete without listing channelization code sets instead of only the number of codes. FIG. 1, however, serves the purpose since it corresponds to a special case where the number of codes is fixed to 5. Therefore, only the number of codes is given.

Traffic between the base station and the mobile station is reduced by employing an information transmission method in which the information related to the modulation coding scheme is converted into the identification data.

The smaller the data size of the identification data, the smaller the traffic. Therefore, identification data having an even smaller data size is desired.

DISCLOSURE OF THE INVENTION

The present invention provides an information transmission method transmitting information of a plurality of types having correlation to a destination of communication, by converting the information of a plurality of types into identification data having a smaller data size than that of the information of a plurality of types, the identification data comprising identification codes of a plurality of types corresponding to respective types of the information, comprising the step of: identifying each of items of information of a first type by using an identification code for information of the first type in combination with identification codes for information of other types.

With this, the data size of the identification code corresponding to the first information is reduced. Therefore, the data size (quantity of signals) required for information transmission is reduced. The surplus data size made available as a result of the reduction may be used for redundancy coding so that the reliability of information transmission is improved.

Conversion from identification codes into the information may be performed using conversion tables showing correspondence between the information and the identification codes.

With this, high-speed conversion is possible.

Conversion from identification codes into the information may be performed using a conversion formula showing correspondence between the information and the identification codes.

With this, conversion into the identification data is possible only by storing the conversion formula so that the required storage volume is stored.

The present invention also provides a mobile communications system comprised essentially of a stationary base station and mobile stations for wireless communication with the base station as they are being moved, and transmitting information of a plurality of types having correlation between the base station and the mobile stations, by converting the information of a plurality of types into identification data having a smaller data size than the information of a plurality of types, the identification data comprising identification codes of a plurality of types corresponding to respective types of the information, comprising: means identifying each of items of information of a first type by using an identification code for information of the first type in combination with identification codes for information of other types.

With this, the data size of the identification data is reduced in a similar configuration as the above-identified information transmission method.

Information related to a modulation coding scheme used by both the base station and the mobile stations may be transmitted between the base station and the mobile stations.

This enables building a system of great use particularly in AMC, in which system the modulation coding scheme is modified depending on an environment of communication.

The information related to the modulation coding scheme may include information relative to a modulation scheme, a spreading code and a transport block size.

With this, necessary and sufficient information related to the modulation coding scheme is transmitted.

A predetermined number of spreading codes, forming a series with a starting spreading code assigned a predetermined identification number, the series belonging to a plurality of serially-numbered spreading codes, may be used for communication between the base station and the mobile station in a multicode scheme, and the predetermined number of spreading codes may be converted into an identification code, by converting a combination of the predetermined identification number assigned to the starting spreading code and the number of codes in a multicode into an associated identification code.

With this, a necessary and sufficient number of identification codes related to the plurality of spreading codes are generated.

The present invention also provides a base station for wireless communication with mobile stations, transmitting information of a plurality of types having correlation to the mobile stations, by converting the information of a plurality of types into identification data having a smaller data size than the information of a plurality of types, the identification data comprising identification codes of a plurality of types corresponding to respective types of the information, comprising: means identifying each of items of information of a first type by using an identification code for information of the first type in combination with identification codes for information of other types.

With this, the data size of identification data is reduced in a similar configuration as the above-identified information transmission method and the mobile communications system.

The present invention also provides a mobile station for wireless communication with a base station, receiving information of a plurality of types having correlation from the base station, the information of the plurality of types being converted into identification data having a smaller data size than the information of a plurality of types, the identification data comprising identification codes of a plurality of types corresponding to respective types of the information, comprising: means identifying each of items of information of a first type by using an identification code for information of the first type in combination with identification codes for information of other types.

With this, the data size of identification data is reduced in a similar configuration as the above-identified information transmission method, the mobile communications system and the base station.

BRIEF DESCRIPTION OF THE DRAWINGS

FIG. 1 shows a TFRC list shown in reference 1.

FIG. 6 shows a conversion table (No. 1) related to channelization code sets.

FIG. 7 shows another conversion table (No. 2) related to channelization code sets.

FIG. 8 shows still another conversion table (No. 3) related to channelization code sets.

FIG. 9 shows a conversion table related to modulation schemes.

FIG. 10 shows conversion related to a TBS size (No. 1).

FIG. 11 also shows conversion related to a TBS size (No. 2).

FIG. 12 also shows conversion related to a TBS size (No. 3).

BEST MODE FOR CARRYING OUT THE INVENTION

Hereinafter, the best mode of carrying out the invention will be described with reference to the attached drawings.

First Embodiment

Figure 2:
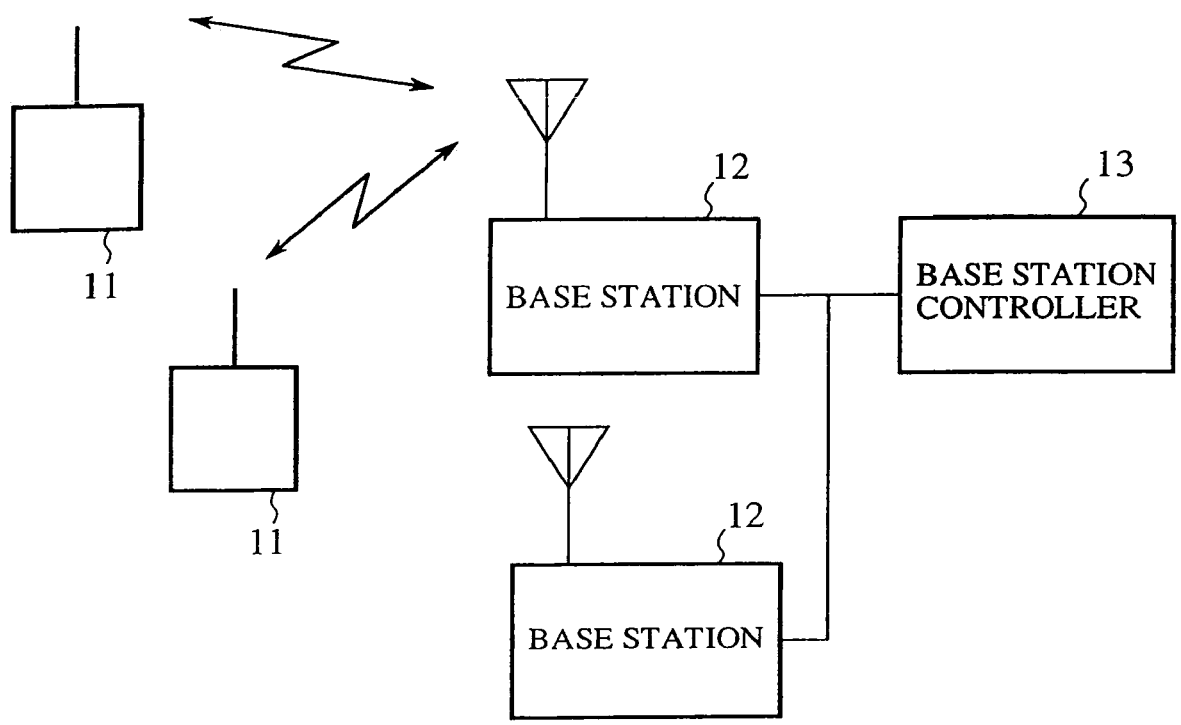
FIG. 2 is a block diagram showing a construction of a mobile communications system according to a first embodiment of the present invention.

FIG. 2 shows a construction of a mobile communications system according to a first embodiment. The communications system comprises a mobile station 11, a base station 12 and a base station controller 13. The mobile station 11 is capable of communicating with the base station 12 as it is being moved by the user carrying the mobile station 11. The base station 12 is equipment installed at a predefined location and is capable of simultaneous wireless communication with a plurality of mobile stations 11. The base station 12 is connected to a base station controller 13 hosting the base station 12 via a cable for transmission between the base station 12 and the base station controller 13. The base station 12 is responsible for connecting the mobile station 11 to a wire communication circuit. The base station controller 13 is connected to a plurality of base stations 12 and responsible for various types of control related to the base station 12. The base station controller 13 is also responsible for connecting the mobile station 11 to the public circuit network (not shown) via the base station 12.

In the mobile communications system shown in FIG. 2, a signal originating from the mobile station 11 is transmitted to a destination of communication via the base station 12, the base station controller 13 and the public circuit network. A signal originating from the destination of communication is transmitted to the mobile station 11 via the public circuit network, the base station controller 13 and the base station 12.

Figure 3:
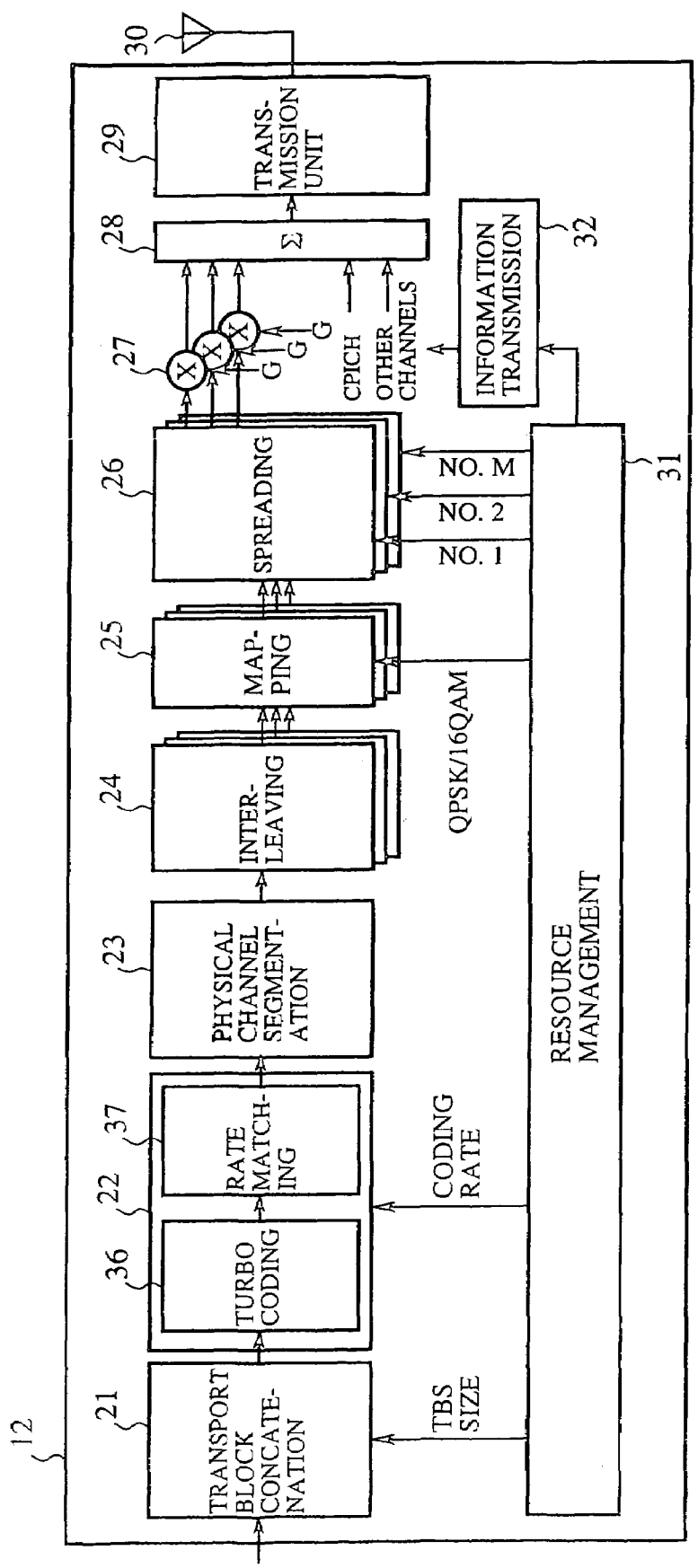
FIG. 3 is a block diagram showing a construction of a base station of FIG. 2.

FIG. 3 shows a construction of the base station of FIG. 2. FIG. 3 only shows a construction related to transmission. The base station comprises a transport block concatenation unit 21, a channel coding unit 22, a physical channel segmentation unit 23, an interleaving unit 24, a mapping unit 25, a spreading 26, a multiplier 27, a multiplexing unit 28, a transmission unit 29, an antenna 30, a resource management unit 31 and an information transmission unit 32. The channel coding unit 22 is provided with a Turbo coding unit 36 and a rate matching unit 37.

A description will now be given of the operation of the base station.

Data transmitted from the base station controller 13 is supplied to the transport block concatenation unit 21 of the base station 12 as a transport block of a fixed size. The transport block concatenation unit 21 generates a TBS by combining transport blocks such that the number of transport blocks is equal to a number corresponding to a TBS size requested by the resource management unit 31, i.e. the number obtained by dividing the TBS size by a transport block size. A TBS indicates a unit of process in the channel coding unit 22. The TBS output from the transport block concatenation unit 21 is subject to a Turbo coding in the Turbo coding unit 36 and also processed to have a predetermined data size in the rate matching unit 37. The channel coding unit 22, comprising the Turbo coding unit 36 and the rate matching unit 37, controls output data to have a predetermined data size, based on a coding rate requested by the resource management unit 31.

The TBS output from the rate matching unit 37 is decomposed by the physical channel segmentation unit 23 into data for each physical channel having a predetermined size. Subsequently, the data is subject to an interleaving process in the interleaving unit 24 before being input to the mapping unit 25. The mapping unit 25 modulates the data output from the interleaving unit 24, using a digital modulation scheme (QPSK or 16 QAM) requested by the resource management unit 31. The spreading unit 26 subjects the data output from the mapping unit 25 to spreading, using a channelization code corresponding to an identification number (1, 2, . . . , M) provided by the resource management unit 31. The multiplier 27 multiplies the data output from the spreading unit 26 by a gain (G). The multiplexing unit 28 multiplexes the data output from the multiplier 27, common pilot channel (CPICH) data and data for other channels. The data output from the multiplexing unit 28 is converted into a signal at a radio frequency in the transmission unit 29 for wireless transmission from the antenna 30 to the mobile station 11.

The resource management unit 31 manages under its control information related to a modulation coding scheme used in communication with a plurality of mobile stations 11, the modulation coding scheme being changed depending on an environment of communication. The resource management unit 31 supplies that information to the relevant components of the base station. Information related to the modulation coding scheme managed by the resource management unit 31 is converted in the information transmission unit 32 into identification data having a small data size for transmission to the mobile station 11 via one of the other channels. The identification data comprises a first identification code indicating a channelization code set, a second identification code indicating a modulation scheme and a third identification code corresponding to a TBS size. The first identification code is obtained by converting the channelization code set into a corresponding code. The second identification code is obtained by converting the modulation scheme into a corresponding code. The third identification code is obtained by converting a combination of the number of codes in a multi-code and a modulation pattern identification (TFRC) into a corresponding code.

Figure 4:
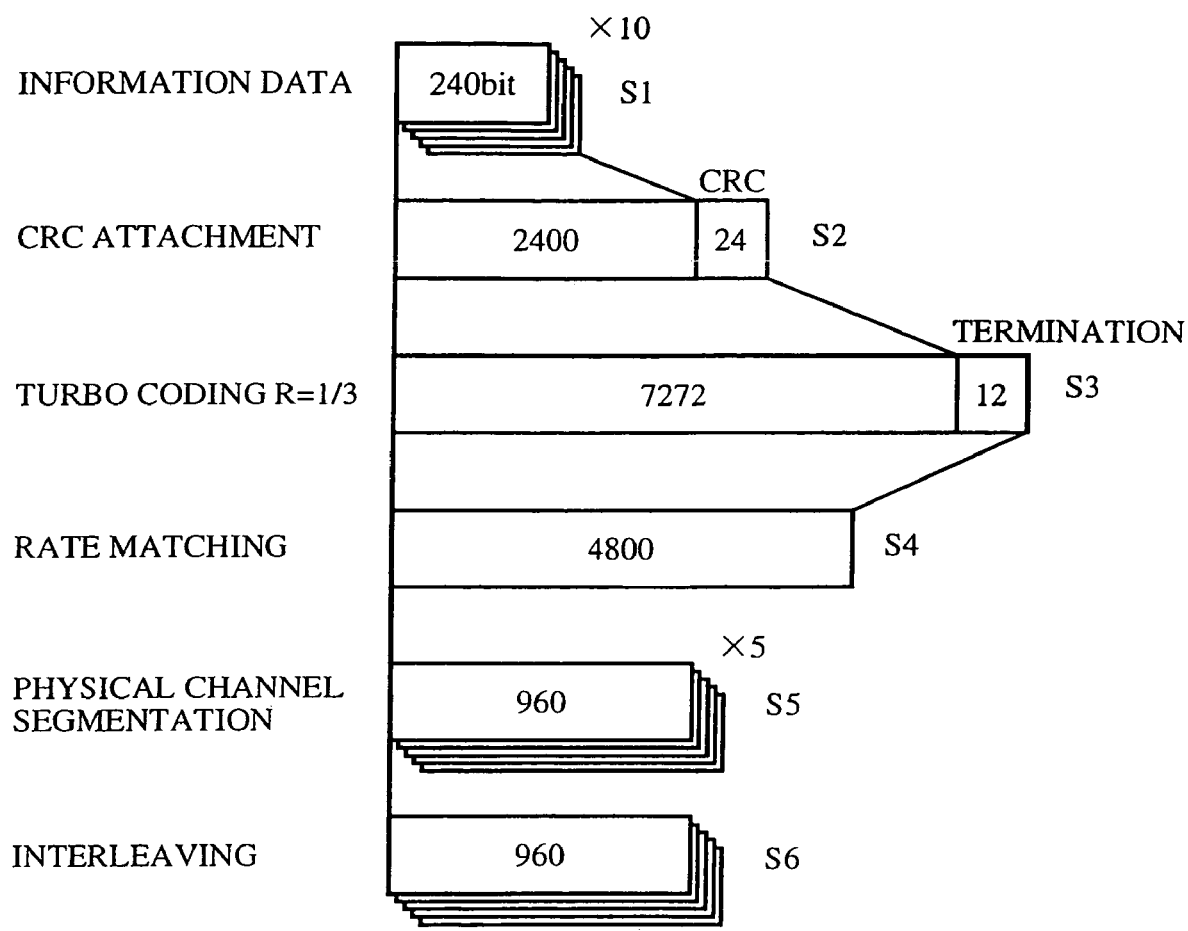
FIG. 4 shows a process of preparing data for transmission performed in the base station of FIG. 2.

FIG. 4 shows a process of preparing data for transmission performed in the base station of FIG. 2. In step S1, a total of ten transport blocks each having a data size of 240 bits are combined so as to produce a 2400-bit TBS (transport block concatenation unit 21). In step S2, 24 CRC bits are attached to the 2400-bit TBS. This is a process preceding the Turbo coding in the channel coding unit 22 of FIG. 3. In step S3, the data is subject to Turbo coding of a coding rate of R=⅓ so as to output 7272 bits, three times the size of data past step S2 (Turbo coding unit 36). In step S4, as a result of a rate matching process, the data size is controlled to 4800 bits (rate matching unit 37).

In step S5, the 4800-bit data is divided into five 960-bit data sets for respective physical channels (physical channel segmentation unit 23).

In step S6, each physical channel data is subject to an interleaving process. The data size remains unchanged (interleaving unit 24). In the example of FIG. 4, it is assumed that the chip rate is 3.84 Mcps, the spreading factor SF=16, the frame size=2 ms, and the modulation scheme=QPSK. The coding rate R in this case is such that R=2424/4800≅½.

Figure 5:
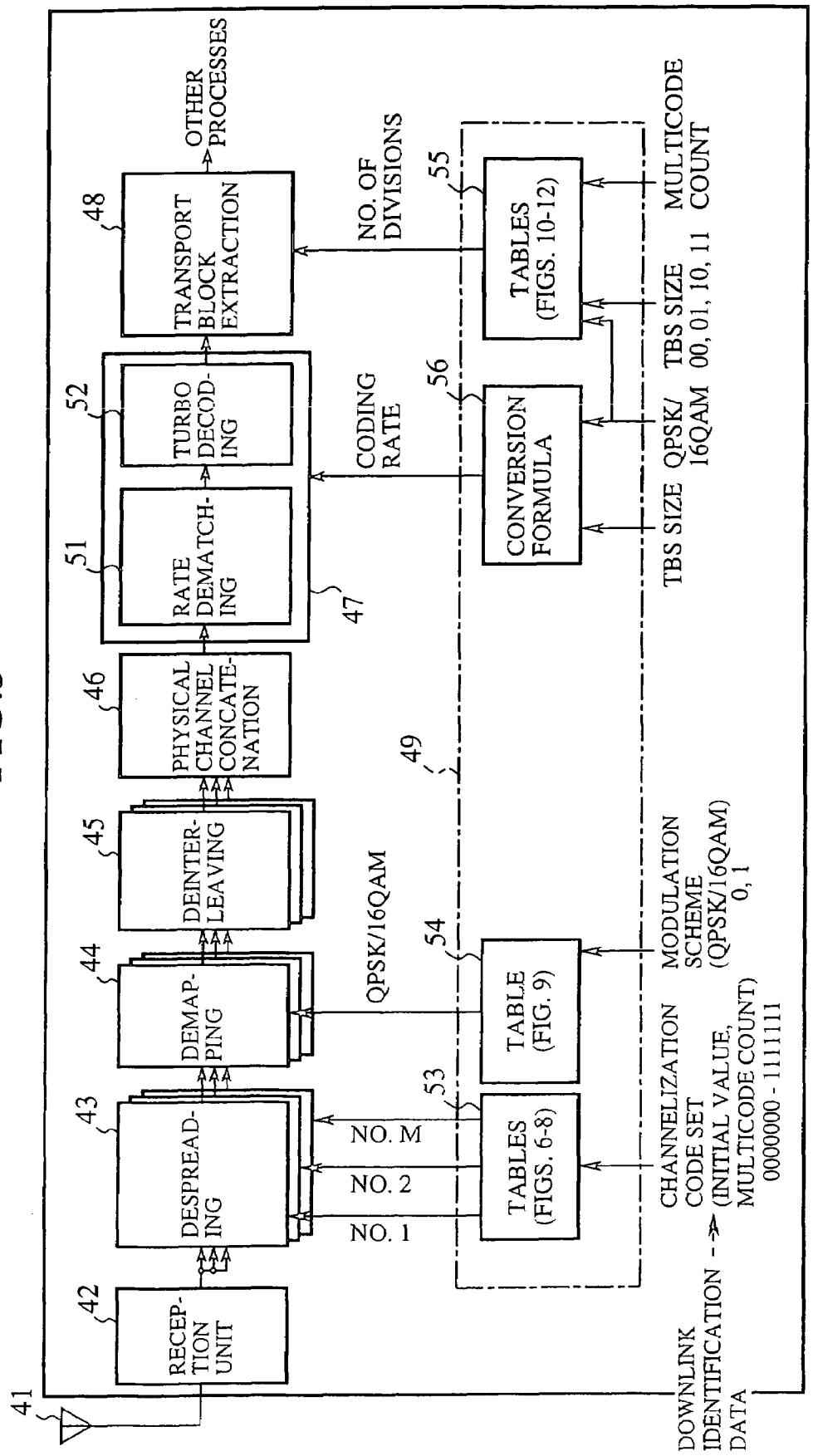
FIG. 5 is a block diagram showing a construction of a mobile station of FIG. 2.

FIG. 5 is a block diagram showing a construction of a mobile station of FIG. 2. FIG. 5 only shows a construction related to reception. The mobile station comprises an antenna 41, a reception unit 42, a despreading unit 43, a demapping unit 44, a deinterleaving unit 45, a physical channel concatenation unit 46, a channel decoding unit 47, a transport block extracting unit 48 and a conversion unit 49. The channel decoding unit 47 is provided with a rate dematching unit 51 and a Turbo decoding unit 52. The conversion unit 49 is provided with conversion tables 53, 54 and 55, and a conversion formula 56.

A description will now be given of the operation of the mobile station.

A radio signal arriving from the base station 12 is received by the antenna 41, the frequency thereof being converted by the reception unit 42 from a radio frequency to a base band frequency. The despreading unit 43 subjects the signal output from the reception unit 42 to a despreading process using a plurality of channelization codes corresponding to identification numbers provided by the conversion unit 49. As a result of the despreading process, a symbol sequence for each physical channel is restored. The symbol sequence output from the despreading unit 43 is subject by the demapping unit 44 to a demodulating process using a digital modulation scheme requested by the conversion unit 49. Subsequently, the data from the demapping unit 44 is subject to a deinterleaving process in the deinterleaving unit 45. The physical channel concatenation unit 46 combines physical channel data so as to restore the TBS.

Subsequently, the TBS is subject to rate dematching in the rate dematching unit 51 and to Turbo decoding in the Turbo decoding unit 52. The channel decoding unit 47, comprising the rate dematching unit 51 and the Turbo decoding unit 52, controls the data output therefrom to have a data size corresponding to the coding rate requested by the conversion unit 49. The transport block extracting unit 48 divides the TBS output from the Turbo decoding unit 52 into transport blocks, the number of transport blocks being requested by the conversion unit 49. The transport blocks are delivered to other processing blocks.

The identification data transmitted from the information transmission unit 32 of the base station 12 is received via a channel other than the physical channels and input to the conversion unit 49. The identification data input to the conversion unit 49 is converted into information related to the modulation coding scheme by the conversion tables 53-55 and the conversion formula 56 provided in the conversion unit 49. The conversion table 53 is a table for converting an identification code indicating a channelization code set into a plurality of identification numbers (1, 2, . . . , M) indicating respective channelization codes. A channelization code set is a group of channelization codes characterized by the same initial value and the same number of codes in a multicode. The conversion table 53 is as shown in FIGS. 6 through 8 (described later). The conversion table 54 is a table for converting an identification code indicating a modulation scheme (QPSK/16 QAM) into data indicating either QPSK or 16 QAM. The conversion table 54 is as shown in FIG. 9 (described later). The conversion table 55 is a table for determining the number of transport blocks included in a transport block set, based on the identification data indicating the TBS size, the number of codes in a multicode and the modulation scheme. The conversion table 55 may constitute a portion of the tables of FIGS. 10 through 12. FIGS. 10 through 12 do not show the conversion table 55 itself. The conversion formula 56 is a conversion formula for determining the coding rate, based on the TBS size and the modulation scheme. Conversion from the identification data into information will be described below. A counterpart process is carried out in the information transmission unit 32 of the base station 12.

FIGS. 6 through 8 show conversion tables related to channelization code sets. It is assumed that the SF(spreading factor)=16 so that the total number of codes is 16. A group of channelization codes at SF=16 are denoted as Cch(16,k), where k(=0-15) represents an identification number. When a plurality of channelization codes are assigned to a single mobile station, a series of channelization codes having the same identification number k are used. It is assumed here that the channelization codes having the identification number k=0 are used for the CPICH or other channels so that they are not assigned to the mobile station. Referring to FIGS. 6 through 8, an initial value is defined as a channelization code at the start of a series of serially-numbered channelization codes. The number of codes in a multicode is defined as the number of codes constituting a multicode. Thus, in FIGS. 6 through 8, a channelization code set is denoted by the initial value and the number of codes in a multicode. Each of combinations of the initial value and the number of codes in a multicode is mapped into an identification code. The correspondence is as described below.

Initial value Cch(16,1), number of codes in multicode 1-15
  ⇔identification codes 0-14
initial value Cch(16,2), number of codes in multicode 1-14
  ⇔identification codes 15-28
initial value Cch(16,3), number of codes in multicode 1-13
  ⇔identification codes 29-41
initial value Cch(16,4), number of codes in multicode 1-12
  ⇔identification codes 42-53
initial value Cch(16,5), number of codes in multicode 1-11
  ⇔identification codes 54-64
initial value Cch(16,6), number of codes in multicode 1-10
  ⇔identification codes 65-74
initial value Cch(16,7), number of codes in multicode 1-9
  ⇔identification codes 75-83
initial value Cch(16,8), number of codes in multicode 1-8
  ⇔identification codes 84-91
initial value Cch(16,9), number of codes in multicode 1-7
  ⇔identification codes 92-98
initial value Cch(16,10), number of codes in multicode 1-6
  ⇔identification codes 99-109
initial value Cch(16,11), number of codes in multicode 1-5
  ⇔identification codes 105-109
initial value Cch(16,12), number of codes in multicode 1-4
  ⇔identification codes 110-113
initial value Cch(16,13), number of codes in multicode 1-3
  ⇔identification codes 114-116
initial value Cch(16,14), number of codes in multicode 1-2
  ⇔identification codes 117-118
initial value Cch(16,15), number of codes in multicode 1
  ⇔identification code 119

Thus, the total number of identification codes required to indicate the entire channelization code sets is 120. In the tables, the identification code is represented by a decimal number. In contract, the identification code entered in FIG. 5 to indicate a channelization code set is represented by 7 binary bits (0000000-1111111). This is in accordance with signaling of a channelization code set using 7 bits described in reference 1.

FIG. 9 shows a conversion table related to the coding scheme. It is assumed here that either QPSK or 16 QAAM is used. An identification code 0 indicates QPSK and an identification code 1 indicates 16 QAM. Identification of the conversion scheme only consumes 1 bit since either of the two should be represented. This is in accordance with 1-bit signaling of modulation scheme described in reference 1.

FIGS. 10 through 12 show conversion related to the TBS size. These figures are extended versions of FIG. 1, which is included in reference 1. As compared to FIG. 1 from reference 1, FIGS. 10 through 12 have additional entries including the transport block (TrBlk) size, the number of transport blocks (TrBlk), and the identification code. The TrBlk size indicates a fixed 240-bit size of a transport block. The number of TrBlk indicates the number of TrBlks included in a TBS. It also indicates the number of segmentations made in the TBS. While FIG. 1 from reference 1 only lists entries having the number of codes in multicode=5, FIGS. 10 through 12 lists entries having the number of codes in multicode=1-15. TFRC (x,y) indicates a set of TFRCs of the number of codes in multicode=y. For example, TFRC(x,5) corresponds to TFRC (x) of FIG. 1. In the identification data column, both a set of identification codes according to the embodiment and a set of identification codes according to the related art are listed.

In a related-art identification code set, a decimal value indicating an identification code is made to match that of the number of TrBlk (the number of TrBlks) for a given TFRC, of a total of 90 TFRCs listed in FIGS. 10 through 12. According to the related art, the TBS size is immediately known by multiplying the TrBlk size by the number of TrBlks. A disadvantage, however, is that a total of 90 identification codes (1-90) are necessary, thereby consuming 7 bits. Reference 1 describes TBS size signaling using 6 bits. Therefore, in principle, a larger data size than is defined in reference 1 is required according to the related art. Of the total of 90 TFRCs, some may have the identical number of TrBlks and the identical TBS size so that, actually, a total of 50 identification codes consuming 6 bits are required. By using a set of 50 (1-50) identification codes instead of the entirety of the 90 (1-90) identification codes such that it is ensured that the same identification code is assigned to a plurality of combinations of the identical TBS size, the related-art arrangement is made to conform to the standard defined in reference 1.

According to the embodiment, for all number of codes in multicode (=y), TFRC(1,y) and TFRC(4,y) are identified by the identification code 1, TFRC(2,y) and TFRC(5,y) are identified by the identification code 2 and TFRC(3,y) and TFRC (6,y) are identified by the identification code 3. The use of identification code as described above, if used alone, is only capable of identifying three TFRCs and is not capable of identifying the entire set of TBS sizes. In combination with the other identification codes, however, it is possible to identify the TBS size successfully. More specifically, the modulation scheme is known immediately from the conversion table of FIG. 9 listing the two identification codes. From the conversion tables of FIGS. 6 through 8, a total of 15 identification codes are known to identify a given number of codes in multicode. For example, of the identification codes listed in FIGS. 6 through 8, a specific set of identification codes including codes 0, 15, 29, 42, 54, 65, 75, 84, 92, 99, 105, 110, 114, 117 and 119 correspond to the number of codes in multicode=1. Accordingly, by combining the identification codes, it is possible to identify a total of 90 (=3×2×1) TFRCs. Since the identification codes 1-3 consuming only 2 bits are sufficient to represent the TBS size, the data size of the identification data is significantly reduced.

Reference 1 defines the use of 6 bits for TBS size signaling. Therefore, an advantageous reduction from 6 bits to 2 bits is achieved according to the embodiment. Alternatively, 4 bits other than the 2 bits consumed according to the embodiment may be used independently so that TBS sizes other than the TBS sizes listed in FIGS. 10 through 12 (for example, 336, 10000 etc.) are transmitted. When the entirety of 6 bits are used, codes (0, 4-63) other than the codes 1-3 used for signaling may be used to transmit TBS sizes other than the TBS sizes listed in FIGS. 10 through 12.

A description will now be given of the conversion formula 56 of FIG. 5.

Given that the data size of a frame after rate matching is denoted by Lrm, and the identification code identifying the modulation scheme is denoted by Mod, the data size Lrm is given by $$Lrm=960*(Mod+1) \quad (1)$$

When the modulation scheme is QPSK, Mod=0 so that Lrm=960. When the modulation scheme is 16 QAM, Mod=1 so that Lrm=1920. Given that the TBS size is denoted by St, the identification code identifying the TBS size is denoted by T, and the number of codes in multicode is denoted by MC, the TBS size St is given by $$St=(T+3*Mod)*MC*240 \quad (2)$$

For example, in the case of TFRC(1,5), i.e., in the case of T=1, Mod=0 and MC=5, $$St=(1+3*0)*5*240=1200$$

In the case of TFRC(5,10), i.e, in the case of T=2, Mod=1 and MC=10, $$St=(2+3*1)*10*240=12000$$

The coding rate R is given by $$R=St/(Lrm*MC) \quad (3)$$

Substituting equations (1) and (2) into equation (3), $$R=(T+3*Mod)/4*(Mod+1) \quad (4)$$

For example, in the case of TFRC(1,5), i.e., in the case of T=1 and Mod=0, $$R=(1+3*0)/4*(0+1)=1/4=0.25$$

In the case of TFRC(5,10), i.e., in the case of T=2 and Mod=1, $$R=(2+3*1)/4*(1+1)=5/8=0.625$$

The formula (4) indicates a conversion formula for determining the coding rate R from the identification code T corresponding to the TBS size and the identification code Mod identifying the modulation scheme. The formula (4) corresponds to the conversion formula 56 of FIG. 5.

According to the embodiment described above, the TBS size is identified by using in combination the identification code identifying the channelization code set, the identification code identifying the modulation scheme, and the identification code obtained by converting a combination of the number of codes in multicode and the modulation pattern identification (TFRC) into a corresponding code. Accordingly, the data size for TBS size identification is reduced. By putting the surplus data size available from the above reduction to the use of redundant coding, the reliability of information transmission is improved.

In the first embodiment, the data size of the identification code corresponding to the TBS size is reduced by using both the number of codes in a multicode and the modulation pattern identification (TFRC). Alternatively, only one of the number of codes in a multicode and the modulation pattern identification (TFRC) may be used to reduce the data size for identification of the TBS size. Also, the related-art identification code set may be used in combination with the modulation pattern identification so as to reduce the data size of the identification code identifying the channelization code set.

Second Embodiment

In the first embodiment, the conversion table 55 is used for conversion between the TBS size and the identification code corresponding to the same. According to the second embodiment, a conversion formula is used instead of the conversion table 55. The conversion formula is the same as the equation (2) given above. The equation (2) is a conversion formula for restoring the TBS size from the identification code corresponding to the TBS size, the identification code Mod identifying the modulation scheme and the number of codes in multicode MC.

As described above, by using the conversion formula instead of the conversion table, the second embodiment eliminates the need to store a conversion table so that the required storage capacity is reduced. The second embodiment finds a useful application in a mobile station having a limited capacity for storage.

INDUSTRIAL APPLICABILITY

As described above, the information transmission method, the mobile communication system, the base station and the mobile station according to the present invention are suitably used to reduce the data size of identification data for reduction of traffic.

The invention claimed is:

1. An information communication method in a base station of performing communication using a plurality of channelization codes based on code division multiple access, comprising:
 transmitting to a mobile station
  a modulation scheme for use in the code division multiple access,
  a number of the channelization codes assigned to the mobile station, and
  an identification code corresponding to a transport block set size,
 wherein the transmitted identification code corresponding to the transport block set size is continuous numbers, and the continuous numbers are transmitted to the mobile station by using bits which are assigned for signaling of the identification code corresponding to the transport block set size, the transport block set size belongs to a first set of transport block set sizes or a second set of transport block set sizes different from the first set of transport block set sizes, the transport block set size included in the first set of the transport block set sizes can be obtained in the mobile station by a part of the continuous numbers, the modulation scheme, and the number of the channelization codes, and the transport block set size included in the second set of the transport block set sizes is different from that included in the first set of the transport block set sizes.

2. The information communication method according to claim 1, further comprising:

generating an identification data comprising the modulation scheme, the number of the channelization codes, and the identification code, wherein the transmitting step includes transmitting the identification data to the mobile station.

3. The information communication method according to claim 1, wherein the transport block set size included in the first set of the transport block set sizes is obtained in the mobile station by using a table which includes transport block set sizes calculated based on each number in the part of the continuous numbers, the modulation scheme, and the number of the channelization codes.

4. A base station for performing communication using a plurality of channelization codes based on code division multiple access, comprising:

a transmitting means for transmitting to a mobile station a modulation scheme for use in the code division multiple access, a number of the channelization codes assigned to the mobile station, and an identification code corresponding to a transport block set size, wherein the identification code corresponding to the transport block set size transmitted by the transmitting means is continuous numbers, the transmitting means transmits the continuous numbers to the mobile station by using bits which are assigned for signaling of the identification code corresponding to the transport block set size, the transport block set size belongs to a first set of transport block set sizes or a second set of transport block set sizes different from the first set of transport block set sizes, and the transport block set size included in the first set of the transport block set sizes can be obtained in the mobile station based on a part of the continuous numbers, the modulation scheme, and the number of the channelization codes, and the transport block set size included in the second set of the transport block set sizes is different from that included in the first set of the transport block set sizes generating means for generating an identification data comprising the modulation scheme, the number of the channelization codes, and the identification code, wherein the transmitting means for transmitting includes means for transmitting the identification data to the mobile station.

5. The base station according to claim 4, wherein the transport block set size included in the first set of the transport block set sizes is obtained in the mobile station based on a table which includes transport block set sizes calculated based on each number in the part of the continuous numbers, the modulation scheme, and the number of the channelization codes.

6. An information communication method of performing communication between a base station and a mobile station using a plurality of channelization codes based on code division multiple access, comprising:

transmitting from the base station a modulation scheme for use in the code division multiple access, a number of the channelization codes assigned to the mobile station, and an identification code corresponding to a transport block set size;

receiving in the mobile station the modulation scheme for use in the code division multiple access, the number of the channelization codes assigned to the mobile station, and the identification code corresponding to the transport block set size; and identifying in the mobile station the transport block set size based on the received identification code corresponding to the transport block set size, wherein the identification code corresponding to the transport block set size is continuous numbers expressed by combining bits assigned for signaling of the identification code corresponding to the transport block set size, the transport block set size belongs to a first set of transport block set sizes or a second set of transport block set sizes different from the first set of transport block set sizes, and in the identifying, the transport block set size included in the first set of the transport block set sizes is obtained by a part of the continuous numbers, the modulation scheme, and the number of the channelization codes, and the transport block set size included in the second set of the transport block set sizes is different from that included in the first set of the transport block set sizes.

7. The information communication method according to claim 6, further comprising:

generating, in the base station, an identification data comprising the modulation scheme, the number of the channelization codes, and the identification code, wherein the transmitting step includes transmitting the identification data to the mobile station.

8. The information communication method according to claim 6, wherein during the identifying performed by the mobile station, the transport block set size included in the first set of the transport block set sizes is obtained using a table which includes transport block set sizes calculated based on each number in the part of the continuous numbers, the modulation scheme, and the number of the channelization codes.

9. A mobile communication system for performing communication between a base station and mobile stations using a plurality of channelization codes based on code division multiple access, wherein:

the base station comprises a transmitting means for transmitting to a mobile station a modulation scheme for use in the code division multiple access, a number of the channelization codes assigned to the mobile station, and an identification code corresponding to a transport block set size; and the mobile station comprises a receiving means for receiving the modulation scheme for use in the code division multiple access, the number of the channelization codes assigned to the mobile station, and the identification code corresponding to the transport block set size, and an identifying means for identifying the transport block set size based on the received identification code corresponding to the transport block set size, wherein the identification code corresponding to the transport block set size is continuous numbers expressed by combining bits assigned for signaling of the identification code corresponding to the transport block set size, the transport block set size belongs to a first set of transport block set sizes or a second set of transport block set sizes different from the first set of transport block set sizes, the identifying means obtains the transport block set size included in the first set of the transport block set sizes based on a part of the continuous numbers, the modulation scheme, and the number of the channelization codes, and the transport block set size included in the second set of the transport block set sizes is different from that included in the first set of the transport block set sizes.

10. The mobile communication system according to claim 9, wherein the base station further comprises:

a generating means for generating, in the base station, an identification data comprising the modulation scheme, the number of the channelization codes, and the identification code, wherein the transmitting means for transmitting further comprises means for transmitting the identification data to the mobile station.

11. The mobile communication system according to claim 9, wherein the identifying means in the mobile station obtains the transport block set size included in the first set of the transport block set sizes using a table which includes each number in the part of the continuous numbers, the modulation scheme, and the number of the channelization codes.

* * * * *